United States Patent [19]

Zondler

[11] 3,905,940

[45] Sept. 16, 1975

[54] PROCESS FOR THE MANUFACTURE OF 5-AMINO-2-(β-CYANOETHYL)-5-CYCLOHEXEN-1-ONE

[75] Inventor: Helmut Zondler, Allschwil, Switzerland

[73] Assignee: Ciba-Geigy Corporation, Ardsley, N.Y.

[22] Filed: Mar. 26, 1973

[21] Appl. No.: 345,153

[52] U.S. Cl. ............. 260/464; 260/288; 260/465.1; 260/563 P
[51] Int. Cl. .................. C07c 121/02; C07c 121/48
[58] Field of Search ..................................... 260/464

[56] References Cited
UNITED STATES PATENTS
3,759,973  9/1973  Cherubim et al. ................. 260/464

OTHER PUBLICATIONS
Cherubim et al.; C. A. 76, (1972) page 343–72063q.

Cherubim et al.; C. A. 76, (1972), page 422–59063v.

*Primary Examiner*—Joseph P. Brust
*Attorney, Agent, or Firm*—Nestor W. Shust; Vincent J. Cavalieri

[57] ABSTRACT

The new compound 5-amino-2-(β-cyanoethyl)-5-cyclohexen-1-one is manufactured by cyclisation of certain bis-cyanoethylated diketones at temperatures between 40° and 250°C in the presence of a basic catalyst and of an organic solvent. A prefered starting substance is 3,3-bis-(β-cyanoethyl)-pentane-2,4-dione. This product can be obtained by cyanoethylation of acetylacetone in the presence of base. The new cyclic ketone 5-amino-2-(β-cyanoethyl)-5-cyclohexen-1-one represents a valuable intermediate product for the manufacture of 7-amino-decahydro-quinoline.

6 Claims, No Drawings

PROCESS FOR THE MANUFACTURE OF 5-AMINO-2-(β-CYANOETHYL)-5-CYCLOHEXEN-1-ONE

The invention relates to a new process for the manufacture of 5-amino-2-(β-cyanoethyl)-5-cyclohexen-1-one of the formula

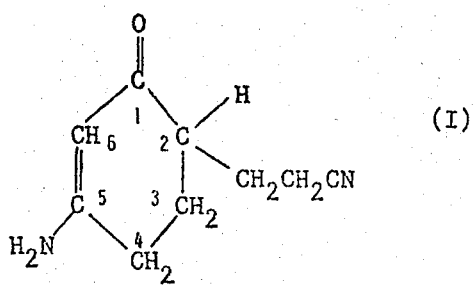

which is characterised in that a bis-cyanoethylated diketone of the general formula

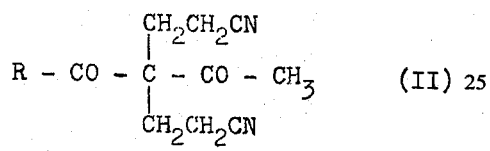

in which R denotes an optionally substituted aromatic radical or an aliphatic radical with a total of 1 to 10 carbon atoms, is cyclised by heating in the presence of a basic catalyst and of an organic solvent to a temperature of between about 40° and 250°, whilst splitting off the molecular radical R—CO—.

Possible bis-cyanoethylated diketones are, for example, compounds in which the radical R in the formula II denotes a phenyl, methyl or ethyl radical. The reaction according to the invention takes place very favourably when employing 3,3-bis-(β-cyanoethyl)-pentane-2,4-dione. The use of this substance in the process according to the invention therefore represents a preferred form of the invention. In principle, however, it is also possible to employ diketones in which, according to the formula II, R denotes a naphthyl radical, a substituted phenyl or ethyl radical or an alkyl radical containing S-bridges or O-bridges.

Possible organic solvents for the process according to the invention are those which dissolve the diketone used as the starting substance, and the basic catalyst, wholly or partially, and which are inert towards the constituents of the reaction mixture. Preferably, alcohols such as, for example, ethylene glycol, ethanol or methanol are employed and the corresponding alkali metal alcoholate of the particular alcohol is used as the basic catalyst. Sodium glycollate in glycol or Na tert.-butylate in tert.-butanol are, for example, particularly suitable. In principle it is also possible, when using an alcohol as the solvent, to employ other basic catalysts, or alkali metal alcoholates of alcohols which differ from the alcohol used as the solvent.

Further suitable solvents to be mentioned are ethers, such as dimethoxyethane, dioxane and tetrahydrofurance. In particular cases, organic amines are also suitable for use as solvents. If, for example, sodium amide is employed as the catalyst, a solution of this substance in methyl aniline is advantageously used.

Furthermore, solvent mixtures can also be used. Such a mixture can also, for example, contain aromatic compounds.

A further catalyst system which can be employed according to the invention is a solution of an alkali metal, such as, for example, sodium, in a mixture of aromatic compounds (preferably naphthalene) and ethers. A part of this solvent will in that case react with the sodium and the actual catalyst, which is soluble in the mixture, will be formed.

Temperatures of 50° to 200°C are particularly suitable for the cyclisation of the diketone of the formula II, whilst splitting off the molecular radical R—CO—. Heating the particular solvent used to the boil is a convenient method of working. The period of heating depends on the temperature at which the reaction is carried out. If, for example, it is carried out in ethylene glycol using sodium glycollate as the catalyst, at 198°C, a period of heating of about 5 minutes suffices. In the case of lower-boiling solvents and lower reaction temperatures, longer reaction times are required. They can, for example, be between 2 and 10 hours.

The isolation and purification of the 5-amino-2-(β-cyanoethyl)-5-cyclohexen-1-one from the reaction mixture is carried out in accordance with the customary known processes. Thus, for example, the solvent can first be removed by distillation and the residue can be freed of the catalyst and of by-products by recrystallisation from ethanol.

The 3,3-bis-(β-cyanoethyl)-pentane-2,4-dione preferentially used as the starting product for the process according to the invention can be manufactured in a simple manner, according to a known process, by cyanoethylation of acetylacetone in the presence of bases. The procedure is described by G. S. Misra and R. S. Asthana in Liebigs Annalen 609 (1957) 240–246. The other bis-cyanoethylated diketones of the formula II which have already been mentioned can be manufactured entirely analogously. In that case, the reaction starts from diketones of the formula R—CO—CH$_2$—CO—CH$_3$, in which R has the abovementioned meaning.

The course of the reaction according to the process of the invention was particularly surprising in the light of the relevant publications on cyclisations of cyanoethylated aliphatic ketones; see: "Zur Cyclisierung cyanathylierter aliphatischer Ketone" ("On the cyclisation of cyanoethylated aliphatic ketones") by M. Cherubim and F. A. Dagga, Angew. Chem. 83 (1971) 896 and "Behaviour of δ-ketonitriles under the conditions of basic catalysis" by T. A. Favorskaya et al., Journal of Organic Chemistry of the USSR (1969), Vol. 5, No. 7, 1,165 – 1,166.

The surprise is due to the fact that in these known cyclisation reactions no organic molecular radicals whatsoever are eliminated. Given the state of the art, an expert would have to expect that in the process according to the invention a double cyclisation would occur and that, for example, in the case of R = methyl a spiro compound of the formula

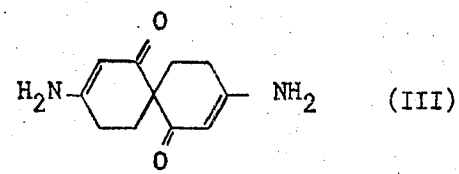

would result or that in the case of a simple cyclisation a product of the formula

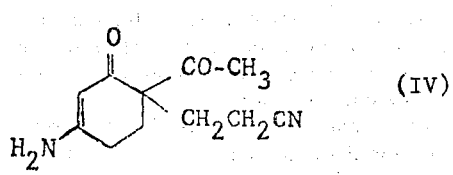

would result. Surprisingly, however, these two substances are not produced. Unexpectedly, the molecular radical R—CO— is split off and the new cyclic ketone of the formula I is produced.

The cyclic ketone of the formula I which can be manufactured by the process according to the invention is new and represents a valuable intermediate product for the manufacture of 7-amino-decahydro-quinoline. The last-mentioned compound is obtained if the new cyclic ketone is hydrogenated in a manner which is in itself known, for example by dissolving in ethanol and hydrogenating in the presence of Raney nickel and ammonia. 7-Amino-decahydro-quinoline is an effective curing agent for epoxide resins.

EXAMPLE 1

20.6 g of 3,3-bis-($\beta$-cyanoethyl)-pentane-2,4-dione are added to a solution of 1.0 g of sodium in 50 ml of ethylene glycol and are briefly heated to the boil therein. The glycol is removed in vacuo and the residue is recrystallised from ethanol. Yield, 4.8 g (29.3% of theory); melting point 163°–166°C. Recrystallisation from 15 ml of ethanol yields 2.8 g of melting point 167°C.

Analysis $C_9H_{12}N_2O$ (M = 164.20):
Calculated:   C 65.83;   H 7.37;   N 17.06.
Found:        C 65.77;   H 7.21;   N 16.99.

The NMR-spectrum in deuterated dimethylsulphoxide proves the structure:

| | | |
|---|---|---|
| $2H_b$ — singlet (broad) | | 6.65 ppm |
| $1H_a$ — singlet | | 4.91 ppm |
| $2H_e+2H_g$ — multiplet | approx. | 2.2–2.70 ppm |
| $2H_d+1H_c+2H_f$ — multiplet | approx. | 1.0–2.2 ppm |

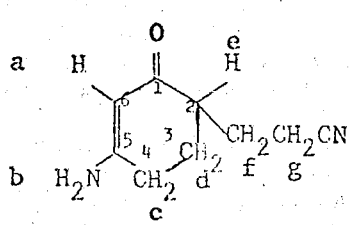

EXAMPLE 2

1 g of sodium is dissolved in 50 ml of absolute ethanol, 20 g of 3,3-bis-($\beta$-cyanoethyl)-pentane-2,4-dione are added and the mixture is boiled for 5 hours under reflux. Hereupon, the bulk of the starting product dissolves. After filtration, 4.2 g of 5-amino-2-($\beta$-cyanoethyl)-5-cyclohexen-1-one of melting point 160° – 163° crystallise out on cooling. Further amounts of the end product can be detected in the filtrate by means of thin layer chromatography.

I claim:

1. Process for the manufacture of 5-amino-2-($\beta$-cyanoethyl)-5-cyclohexen-1-one of the formula

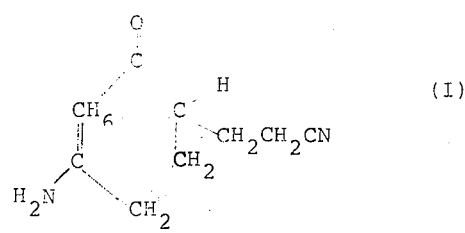

characterised in that a bis-cyanoethylated diketone of the formula

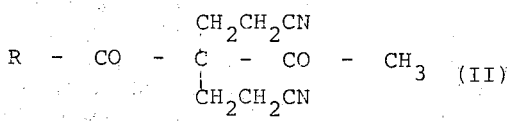

in which R denotes phenyl, naphthyl, or alkyl of 1 to 10 carbon atoms, is cyclised by heating in the presence of a basic catalyst selected from the group consisting of an alkali metal alkanolate, alkali metal or sodium amide, and an organic solvent within which said diketone and basic catalyst is wholly or partially soluble and which is inert towards the constituents of the reaction mixture, to a temperature between about 40° and 250°C, whilst splitting off the molecular radical R—CO—.

2. Process according to claim 1, characterised in that 3,3-bis-($\beta$-cyanoethyl)-pentane-2,4-dione is employed as the diketone of the formula II.

3. Process according to claim 1, characterised in that an alkali metal alkanolate is employed as the basic catalyst.

4. Process according to claim 1, characterised in that a monohydric or polyhydric alcohol is employed as the solvent.

5. Process according to claim 1, characterised in that the cyclisation reaction is carried at about 50° to 200°C.

6. 5-Amino-2-($\beta$-cyanoethyl)-5-cyclohexen-1-one.

* * * * *